(12) United States Patent  (10) Patent No.: US 7,507,271 B2
Caesar et al.  (45) Date of Patent: Mar. 24, 2009

(54) CARTRIDGE FILTER FOR PURIFYING GAS

(75) Inventors: Thomas Caesar, Leimen (DE); Renate Tapper, Bensheim (DE); Thomas Schroth, Bobenheim (DE)

(73) Assignee: Carl Freudenberg KG, Weinheim (DE)

( * ) Notice: Subject to any disclaimer, the term of this patent is extended or adjusted under 35 U.S.C. 154(b) by 316 days.

(21) Appl. No.: 10/514,517

(22) PCT Filed: Mar. 12, 2003

(86) PCT No.: PCT/EP03/02523

§ 371 (c)(1),
(2), (4) Date: Sep. 13, 2005

(87) PCT Pub. No.: WO03/097201

PCT Pub. Date: Nov. 27, 2003

(65) Prior Publication Data

US 2006/0107637 A1 May 25, 2006

(30) Foreign Application Priority Data

May 15, 2002 (DE) ................................ 102 21 807

(51) Int. Cl.
B01D 39/00 (2006.01)
B01D 59/50 (2006.01)
B01D 46/00 (2006.01)
(52) U.S. Cl. .............................. 55/495; 55/490; 55/493
(58) Field of Classification Search .................. 55/495, 55/490, 493
See application file for complete search history.

(56) References Cited

U.S. PATENT DOCUMENTS 2,909,237 A * 10/1959 O'Dell ........................ 55/490
4,257,866 A * 3/1981 Belle et al. .................. 204/253
5,399,180 A * 3/1995 Kopp ........................... 55/493
5,476,526 A * 12/1995 Attermeyer .................. 55/496
5,792,228 A 8/1998 Fath et al. ..................... 55/497
5,840,094 A 11/1998 Osendorf et al. ............. 55/497
6,059,966 A 5/2000 Brandhofer et al. ......... 210/232
6,274,039 B1 * 8/2001 Brandhofer et al. ......... 210/232
6,464,745 B2 * 10/2002 Rivera et al. ................. 55/497
2004/0172926 A1 9/2004 Meierhoeffer et al. ........ 55/495

FOREIGN PATENT DOCUMENTS

| DE | 9301754 | 5/1993 |
|---|---|---|
| DE | 4229135 | 8/1993 |
| DE | 43 17 506 | 1/1995 |
| DE | 19545046 | 6/1997 |
| DE | 19545064 | 6/1997 |
| DE | 197 11 280 | 9/1998 |
| DE | 10137926 | 3/2003 |
| EP | 0301129 | 8/1991 |

* cited by examiner

*Primary Examiner*—Walter D Griffin
*Assistant Examiner*—Amber Orlando
(74) *Attorney, Agent, or Firm*—Davidson, Davidson & Kappel, LLC

(57) ABSTRACT

The invention relates to a cartridge filter for purifying gases, said filter being especially embodied as a filter for fine or suspended matter. The inventive filter comprises a frame into which at least one folded package which consists of a filter material through which gas flows is introduced. The end pieces of the strips of frames are interconnected by corner connectors. said frame strips (1) consists of at least two individual elements (2,3) which are oriented perpendicularly to the direction of flow, engage with each other in a positively locking manner, and/ or can be interconnected.

12 Claims, 9 Drawing Sheets

CARTRIDGE FILTER FOR PURIFYING GAS

The present invention is directed to a cartridge filter for purifying gases, especially as a filter for fine or suspended particulate matter, having a frame, into which one or more fold packs made of a filter material and traversed by the gas flow are inserted, the end pieces of the frame strips being interconnected by corner connectors.

BACKGROUND

In plants equipped with clean rooms, very high demands are placed on the purity of the ambient air. Air that is purified of dust and microorganisms is necessary, in order to maintain the desired level of air purity. In addition to filter mats and bag filters, so-called cartridge filters are a common type of air filter design. A conventional type of cartridge filter design has a fold pack that is oriented perpendicularly to the direction of flow and is provided with an outer frame. The fold pack and the frame are sealed from one another by a sealing material. The fold packs themselves are made of accordion-fold filter paper. Under conditions involving suspended particulate matter, plastics, which are mostly processed in liquid form, are used as sealing material. When working with filters for fine particulate matter, a filter fleece can also be inserted as sealing material.

The outer frame gives the filter the requisite mechanical stability, protects the fold pack from damage, and allows the filter element to be inserted into a holding fixture in a sealing-seat type of installation. The individual filter frames are assembled from four frame strips, the use of corner connectors also being additionally possible.

Cartridge filters are requested by customers in virtually all possible dimensions and design variants. This leads to a very cost-intensive single-part production, in particular of the frame strips, since each dimension necessitates a separate deep-drawing die or casting mold.

The German Patent Application DE 195 45 064 A1 describes a filter insert which can be described as a cartridge filter. The filter insert is made of a filter frame and a fold pack, the latter being arranged gas-imperviously in the filter frame by a seal along its outer periphery.

The German Patent DE 195 45 046 C2 describes a fold pack design for insertion into a cartridge filter.

In the not previously published German Patent Application DE 101 37 926.9, a cartridge filter is discussed, whose frame is made of profiled strips of the same design and of corner connectors that grasp the profiled strips at the end pieces thereof. This cartridge filter has the advantage that the frame can be manufactured very simply with very different dimensions. The frame can be assembled from profiled strips, from cut-to-length sections of a continuously extruded profile, in any desired size. This means that the height and width of the frame can be varied as needed when working with a predefined form of a profiled strip. However, the depth of the cartridge filter, i.e., the dimensions from the inflow side to the outflow side of the air, is predetermined by the width of the profiled strip.

SUMMARY OF THE INVENTION

An object of the present invention is to further refine a cartridge filter in a way that will enable the depth of the filter to be varied as well. In the process, it is intended that the manufacturing of the cartridge filter continue to remain as simple and cost-effective as possible.

The present invention provides a cartridge filter of the type mentioned at the outset in that the frame strips of the cartridge filter are made of at least two individual components that are oriented transversely to the direction of the gas flow, are positively interlocking and/or are interconnectable. In other words, in the direction of the gas flow, the frame strips are composed of a plurality of component parts that are to be assembled into a frame aggregate. Thus, a type of modular system is formed, which is composed of frame strips and corner connectors of different sizes, which may be assembled into any desired cartridge filters. The result is that this greatly economizes on the number of tools required for manufacturing the filter frames.

The adjoining component parts of the frame strips are additionally grasped and held by the corner connectors. This accords a greater inherent stability to the multi-part frame strips.

It is beneficial for the stability of the frame when its component parts have a double-walled construction, in which the two walls are spaced apart from one another. In addition, the walls of the component parts may be interconnected by transversal ribs extending alongside of the component parts.

Corner connectors may be advantageously used, which are equipped with tongues that engage between the walls of the component parts and that adjoin the walls and/or the transversal ribs. An especially effective holding action is provided by the corner connectors when they are able to fit into each other in pairs.

The positive form-locking interconnection of the component parts to form frame strips may be accomplished by a plug-in connection extending along the connecting edges of the component parts. This plug-in connection may have very different designs. One possibility provides for the plug-in connection to be produced by a hook-shaped, interlocking formation of the connecting edges of two adjacent component parts. The plug-in connection may also be formed, however, by a tongue and groove type formation of the connecting edges of two adjacent component parts. In the plug-in connection design, care must be taken that a stable as possible connection be produced between the two component parts. In simpler specific embodiments of frames, plug-in connections are also possible in which, for example, a connecting edge is formed with a groove, and the opposite facing connecting edge is formed with a section that is insertable into the groove.

To facilitate the introduction of sealing material, whether it be in liquid or in nonwoven fabric form when securing the fold pack in the frame, the frame strips are provided on their longitudinal sides with inwardly directed angle pieces. These angle pieces prevent liquid material from flowing out of the frame during manufacturing, for example.

The component parts for the frame strips are preferably manufactured by cutting to length sections of continuously extruded profiles. The extruded profiles may be of very different types of construction.

BRIEF DESCRIPTION OF THE DRAWING

The present invention is explained in greater detail in the following with reference to an exemplary embodiment illustrated in the drawings, in which show.

DETAILED DESCRIPTION

Figure 1:
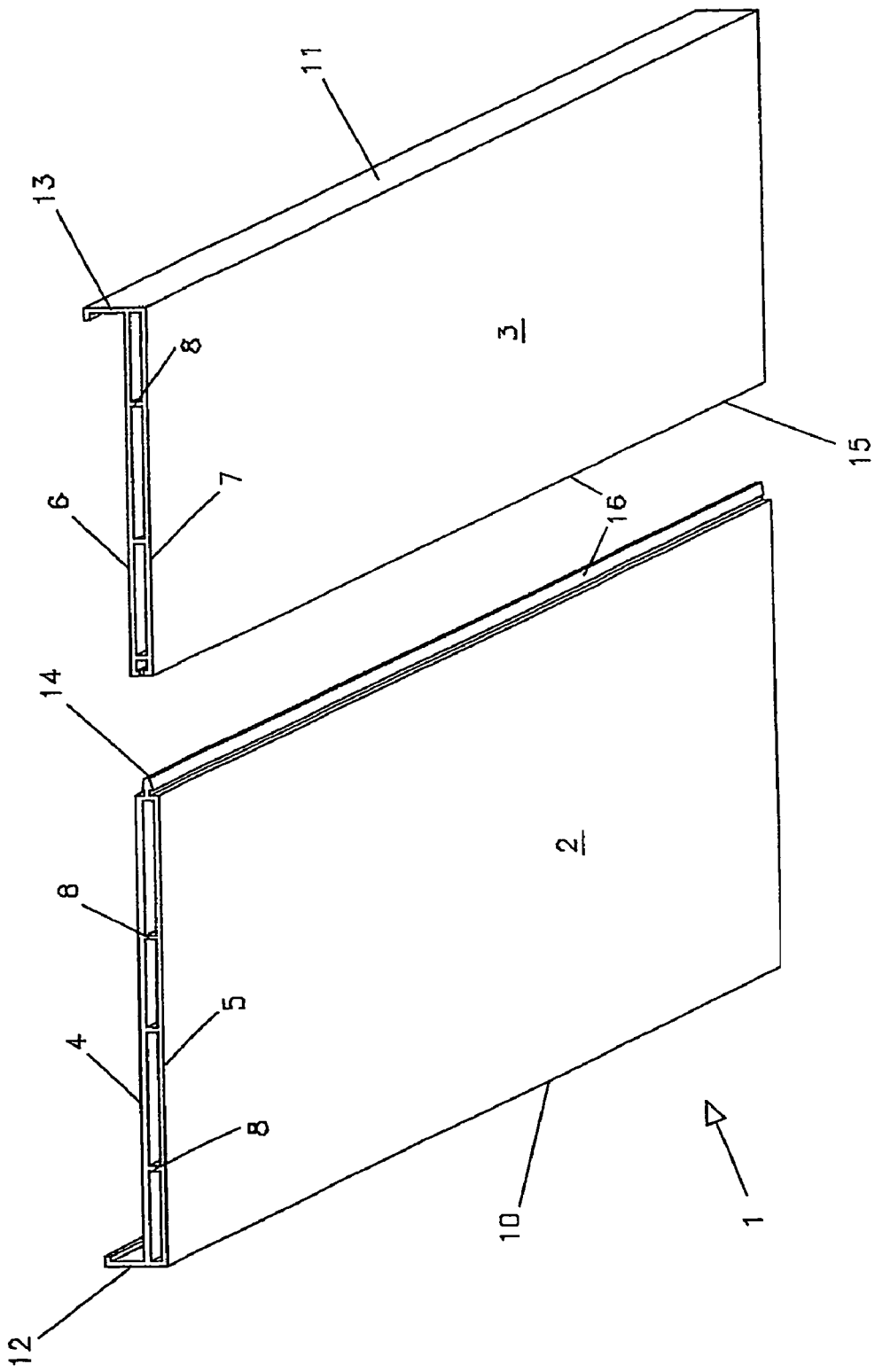
FIG. 1 a frame strip of two component parts which are not yet fitted into each other.

Frame strip 1 shown in a top right perspective view in FIG. 1 is composed of the two component parts 2 and 3, which may be positively interlocked. Component parts 2 and 3 have a double-walled construction. Walls 4 and 5 and, respectively, 6 and 7 are spaced apart from one another. The distance by which the walls are spaced apart, and their stability as well, are determined and, as the case may be, increased by transversal ribs 8. Frame strips 1 are provided on their longitudinal sides 10, 11 with inwardly directed angle pieces 12, 13. The adjacent and diametrically opposed connecting edges 14, 15 of component parts 2, 3 are designed to positively interlock and, in fact, in the present example, as plug-in connection 16. This plug-in connection 16 is illustrated in greater detail in FIG. 3.

Figure 2:
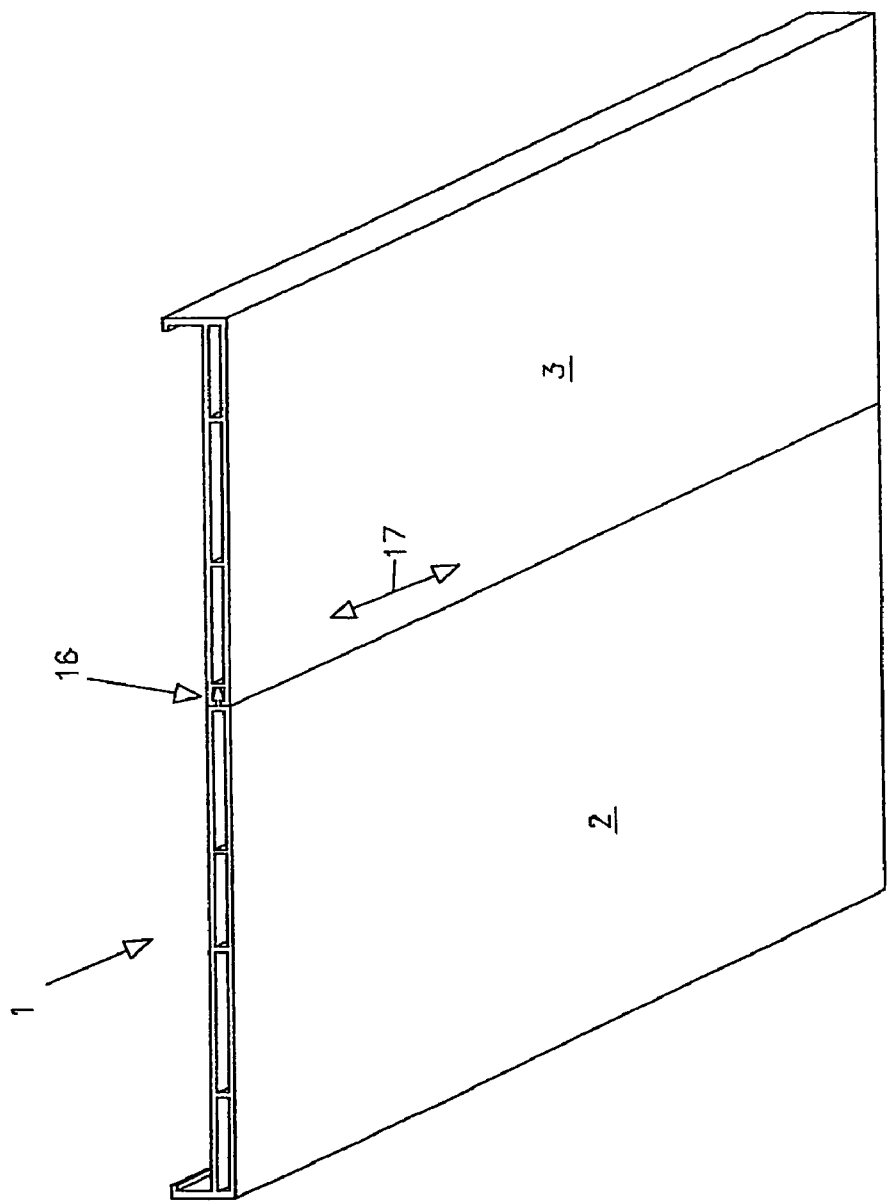
FIG. 2 the component parts according to FIG. 1, intermated.

FIG. 2 shows the two component parts 2 and 3 joined together by plug-in connection 16. Thus, a frame strip 1 is prepared for the further manufacturing of the frame aggregate. Component parts 2, 3 are fitted together either, as shown by arrow 17, by placing the end faces of the two component parts 2, 3 against each other and then by moving them in the longitudinal direction, or by pressing them together perpendicularly to the direction indicated by arrow 17.

Figure 3:
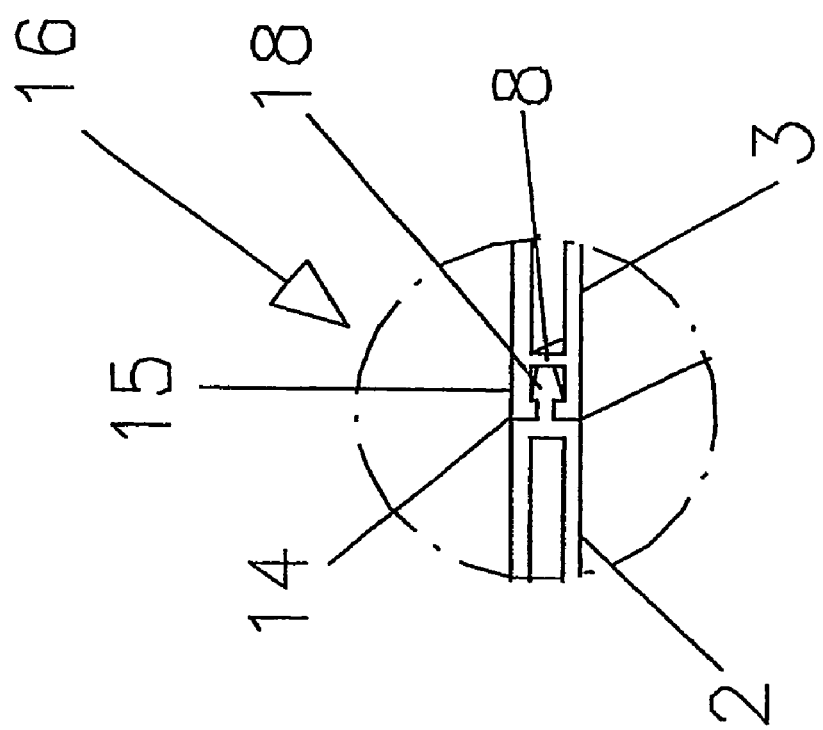
FIG. 3 an enlarged plan view of a plug-in connection.

FIG. 3 is an enlarged view of the embodiment of plug-in connection 16 in the front view of the two component parts 2 and 3. Plug-in connection 16 has a tongue and groove type design. Component part 2 is provided on its connecting edge 14 with a fitting strip 18, which is inserted so as to positively engage in the groove introduced in opposite connecting edge 15 and, respectively, formed by the two walls of component part 3 and by transversal rib 8. Fitting strip 18 is designed to fit with positive engagement between the walls of component part 3 and fit closely against transversal rib 8.

Figure 4:
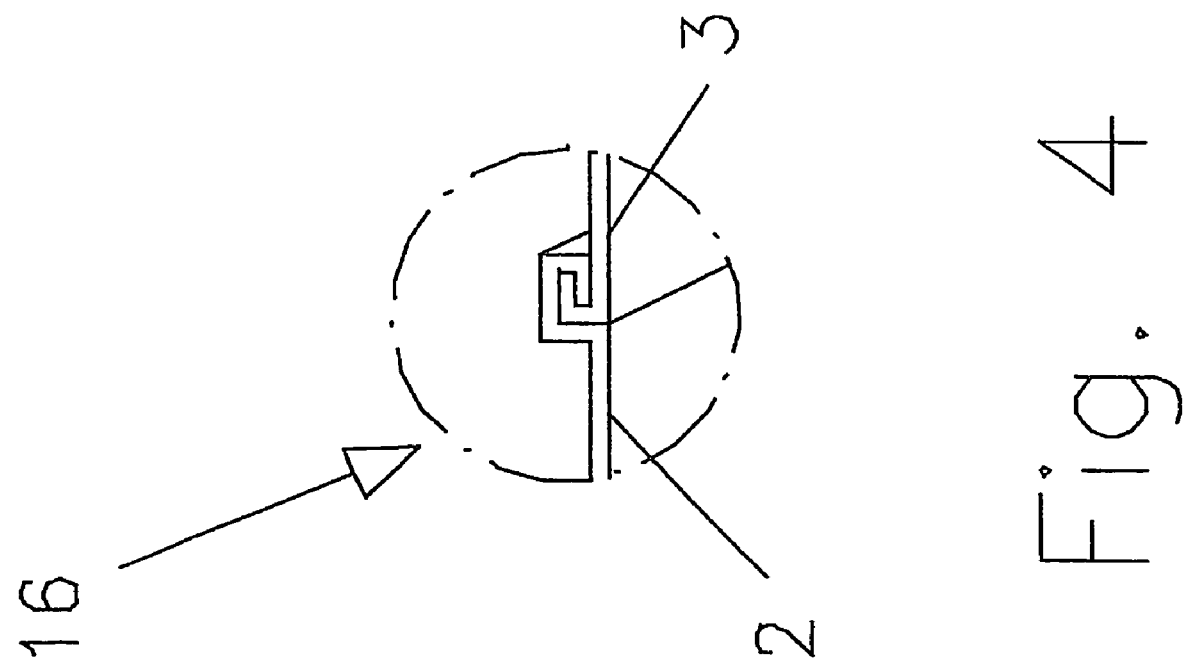
FIG. 4 another possible design of the plug-in connection in a plan view.

FIG. 4 shows only one possible appearance, for example, of a plug-in connection 16 when component parts 2, 3 have a single-walled design. Here, an embodiment is possible whereby connecting edges 14, 15 of component parts 2, 3 have a hook-shaped, interlocking formation, and they are fitted together.

Figure 5:
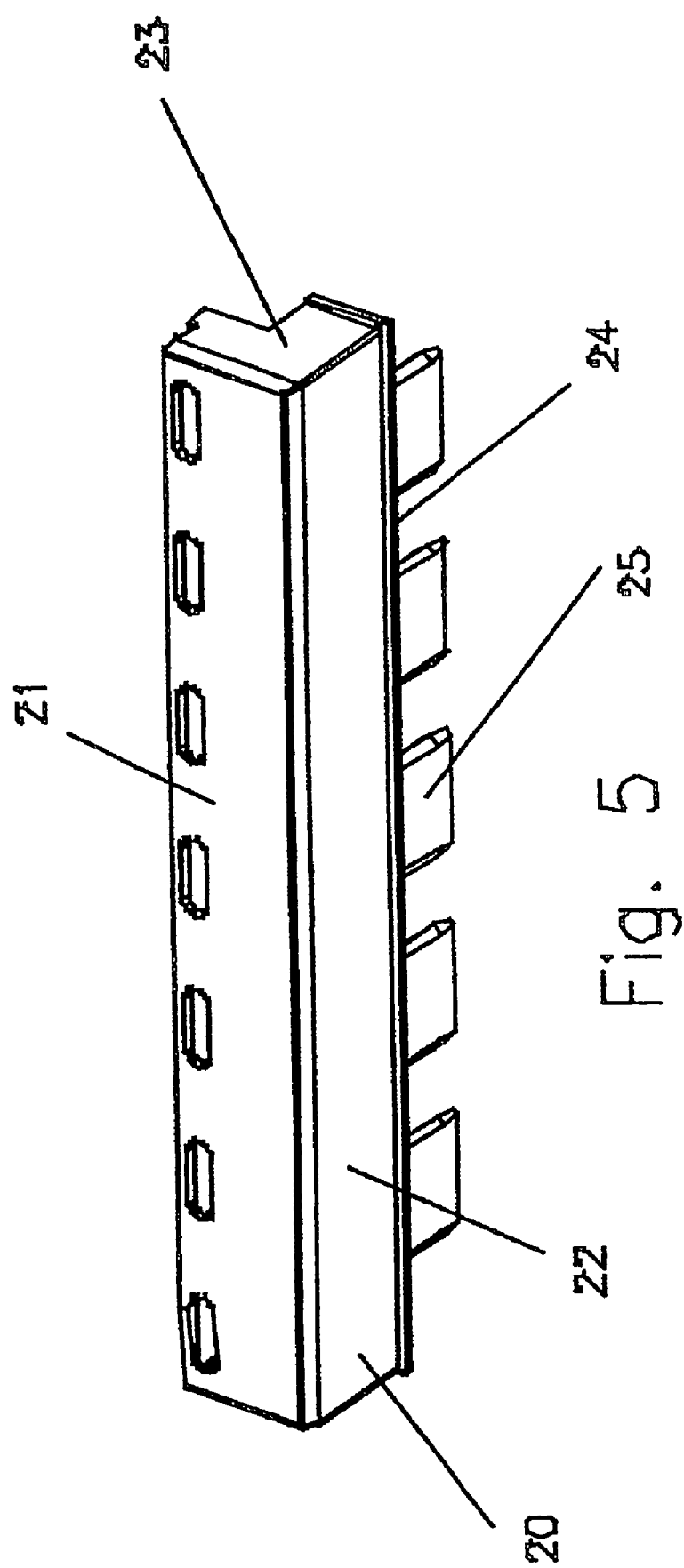
FIG. 5 a corner connector in a perspective view.

FIG. 5 shows a corner connector 20 in the oblique view from above. Corner connector 20 is made of an angle piece, composed of two surface areas 21 and 22. Both walls 21 and 22 are terminated at the end faces by attached extension pieces 23. On its outer edge 24, wall 22 has projecting tongues 25, which may be inserted into the interstitial spaces between walls 4 through 7. Inserted, tongues 25 fit snugly on walls 4 through 7 and on corresponding transversal ribs.

Figure 6:
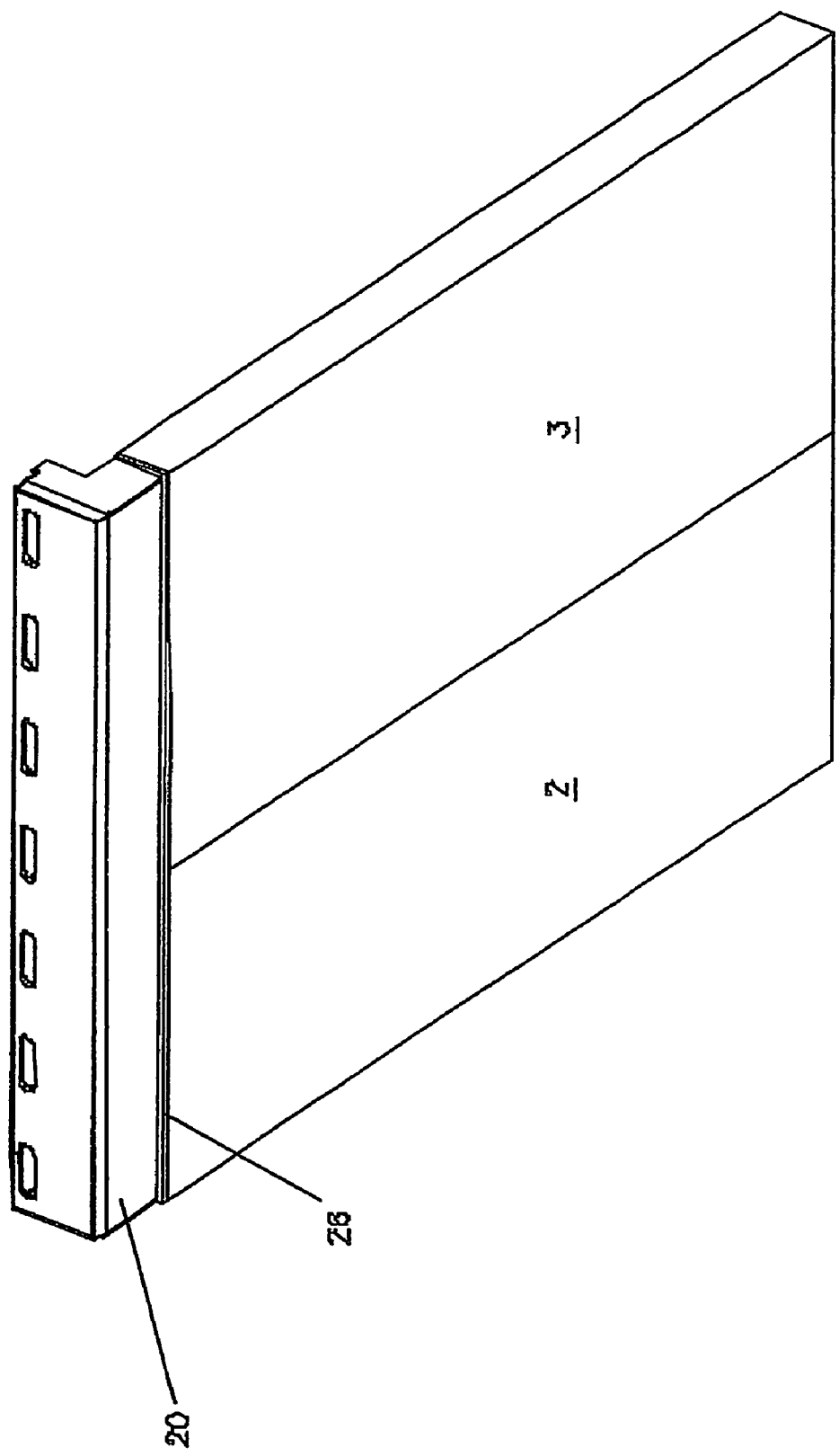
FIG. 6 a view of a frame strip having a superimposed corner connector.

FIG. 6 shows two component parts 2 and 3 together with plugged-on corner connector 20. The outer dimensions of corner connector 20 are kept slightly smaller than those of component parts 2, 3.

This becomes apparent by edge 26, which is formed when corner connector 20 is slipped onto component parts 2, 3. Corner connector 20 is not multi-part and it holds component parts 2, 3 securely together because its tongues 25 mate with walls 4 through 7 of component parts 2, 3 and ribs 8 of component parts 2, 3.

Figure 7:
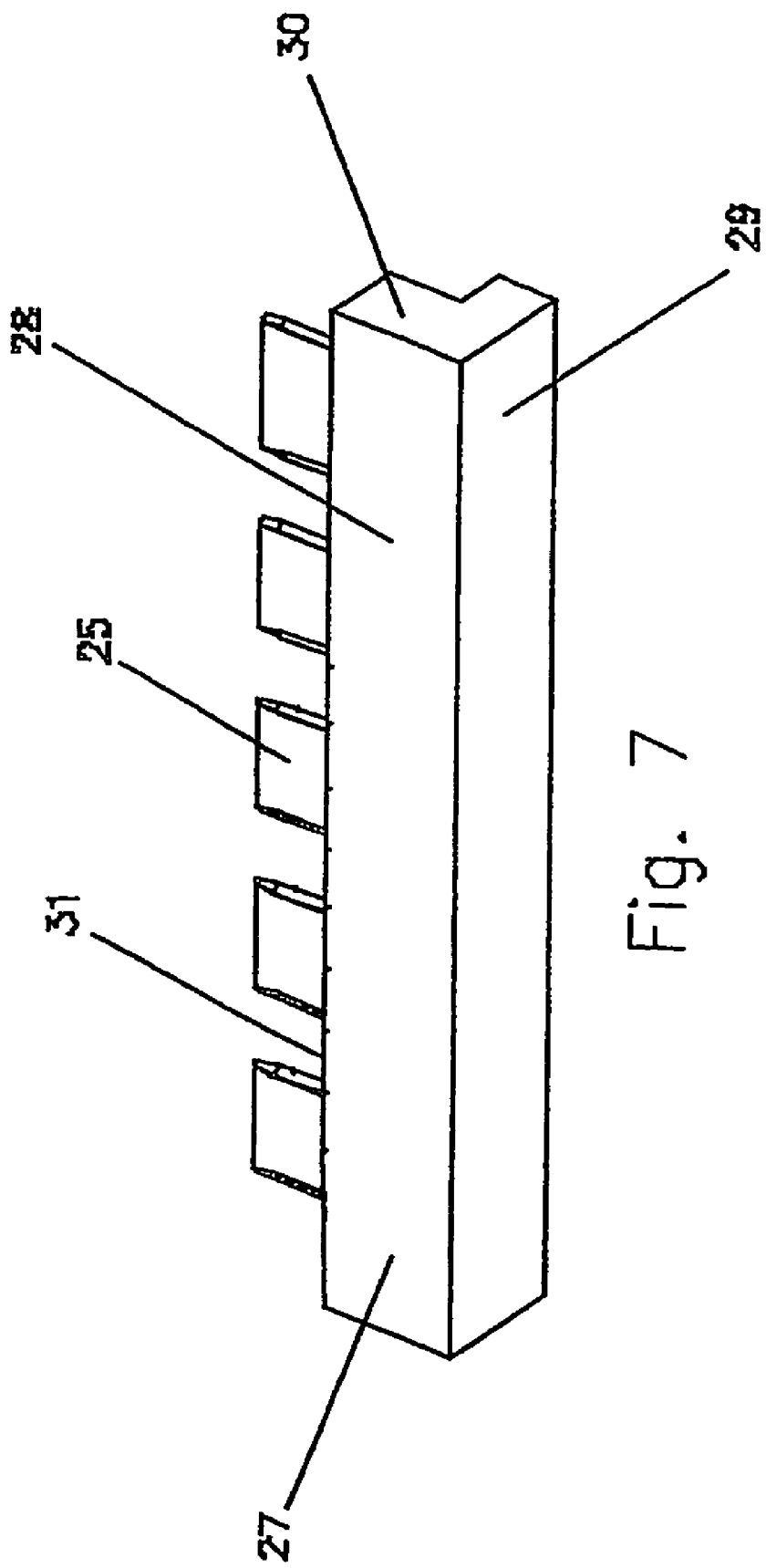
FIG. 7 an outer corner connector in a perspective view.

Corner connector 27 shown in FIG. 7 is likewise composed of two walls 28, 29 which are disposed at right angles to one another and are terminated on the side by end caps 30. Tongues 25 are affixed at outer edge 31 of wall 28. They engage in the spaces between walls 4 through 7 and ribs 8 of component parts 2 and 3.

Figure 8:
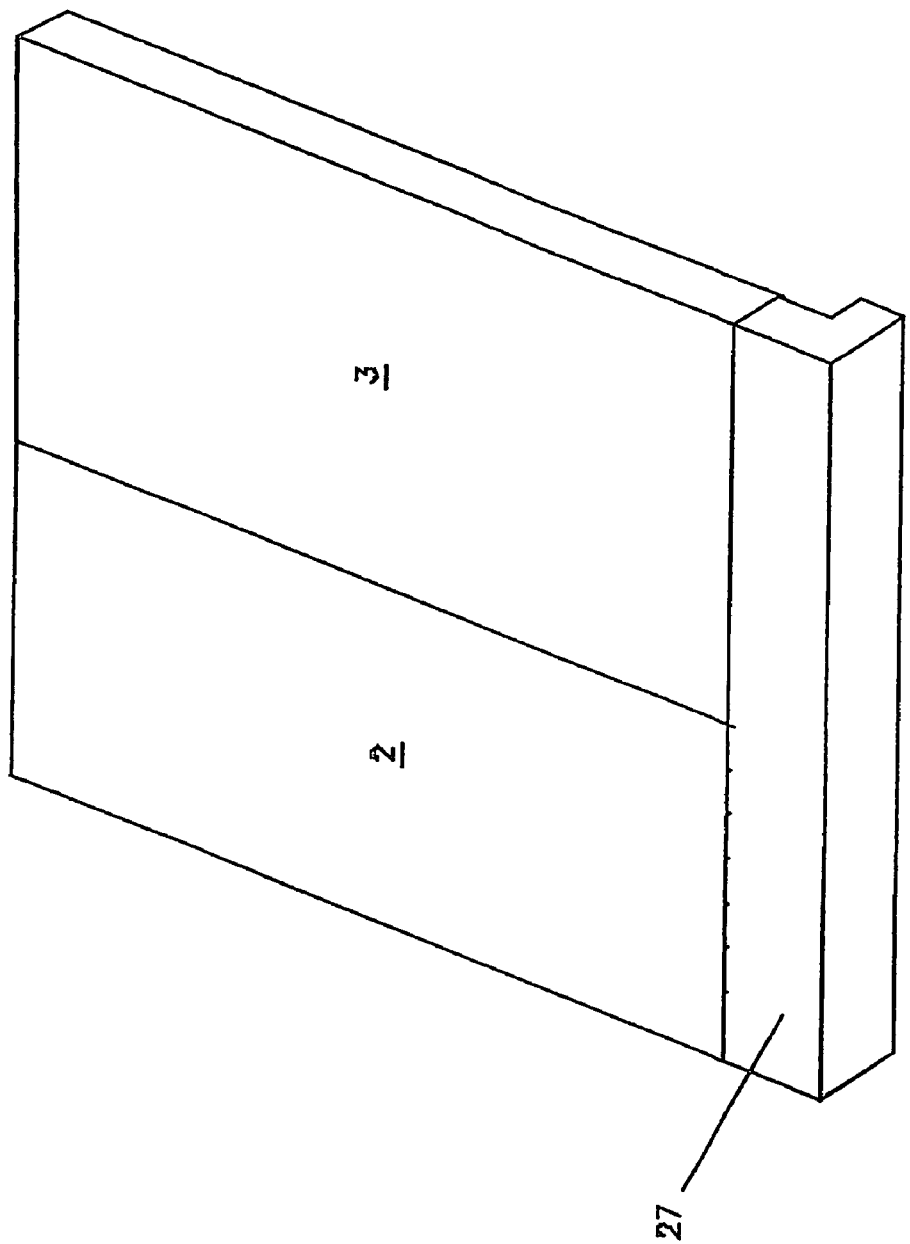
FIG. 8 a frame strip having the corner connector according to FIG. 7.

Illustrated in FIG. 8, likewise in the side view, are fitted-together component parts 2, 3, including corner connector 27. The outer dimensions of corner connector 27 correspond to the dimensions of component parts 2, 3, so that the outer surfaces of corner connector 27 and of component parts 2, 3 are in alignment with each other. The inside dimensions of corner connector 27 are selected to enable corner connector 27 to be superimposed on corner connector 20.

Figure 9:
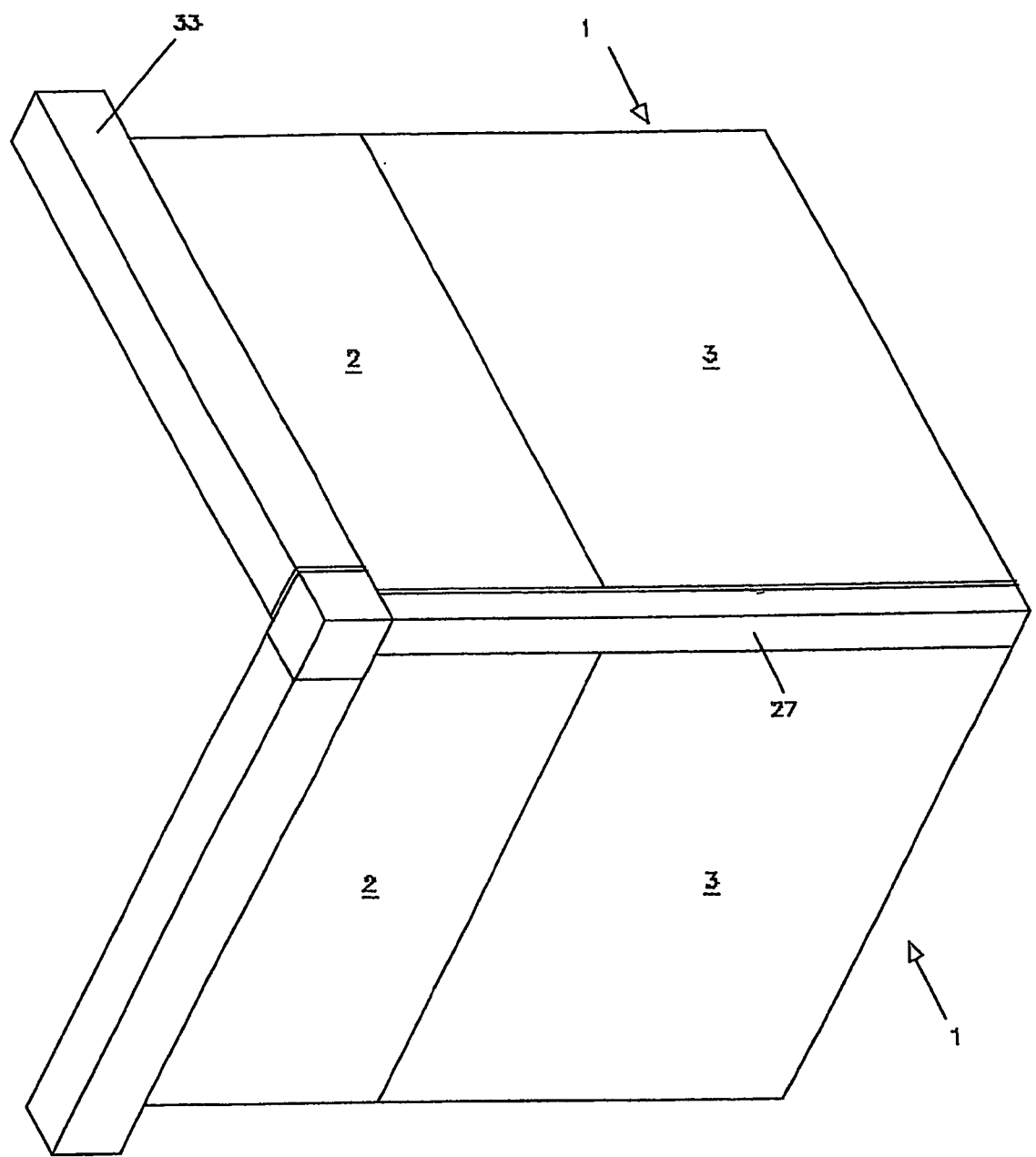
FIG. 9 two frame strips that are fitted together at right angles, having a top holder frame.

FIG. 9 shows a perspective view of two frame strips 1, each of two component parts 2 and 3, which are joined together by corner connectors 20, 27. Visible in the illustration is merely outer corner connector 27. Visible on the end face of the two frame strips 1 is a so-called top holder frame 33, which may be produced by suitably forming an angle piece 12, as shown in FIG. 1. Angle piece 12 is designed for this purpose.

What is claimed is:

1. A cartridge filter for purifying a gas comprising:
   at least one fold pack including a filter material traversed by a flow of the gas; and
   a frame receiving the at least one fold pack, wherein the frame includes
   a plurality of frame strips having end portions, each frame strip including at least two adjoining component parts oriented transversely to a direction of a flow of the gas, the two adjoining component parts being positive interlocking and/or interconnectable with one another, and
   a plurality of corner connectors interconnecting end portions of the plurality of frame strips, wherein the corner connectors are able to fit into each other in pairs.

2. The cartridge filter as recited in claim 1, wherein the adjoining component parts are additionally grasped and held by the corner connectors.

3. The cartridge filter as recited in claim 1, wherein each of the at least two adjoining component parts has a double-walled construction, formed from two walls spaced apart from one another.

4. A cartridge filter for purifying a gas comprising:
   at least one fold pack including a filter material traversed by a flow of the gas; and
   a frame receiving the at least one fold pack, wherein the frame includes
   a plurality of frame strips having end portions, each frame strip including at least two adjoining component parts oriented transversely to a direction of a flow of the gas, the two adjoining component parts being positive interlocking and/or interconnectable with one another,
   a plurality of corner connectors interconnecting end portions of the plurality of frame strips;
   wherein each of the at least two adjoining component parts has a double-walled construction, formed from two walls spaced apart from one another; and
   wherein each of the at least two adjoining component parts includes transversal ribs extending along the component parts and interconnecting the two walls.

5. A cartridge filter for purifying a gas comprising:
   at least one fold pack including a filter material traversed by a flow of the gas; and
   a frame receiving the at least one fold pack, wherein the frame includes
   a plurality of frame strips having end portions, each frame strip including at least two adjoining component parts oriented transversely to a direction of a flow of the gas, the two adjoining component parts being positive interlocking and/or interconnectable with one another,
   a plurality of corner connectors interconnecting end portions of the plurality of frame strips;

wherein each of the at least two adjoining component parts has a double-walled construction, formed from two walls spaced apart from one another; and wherein each of the corner connectors includes a plurality of tongues that engage between the two walls of a respective component part and are adjacent to the walls and/or the transversal ribs.

6. The cartridge filter as recited in claim 1, wherein the adjoining component parts are interconnected in a positive form-locking manner via a plug-in connection that extends along connecting edges of the adjoining component parts.

7. The cartridge filter as recited in claim 6, wherein the plug-in connection includes a hook-shaped, interlocking formation of the connecting edges of two adjacent component parts.

8. The cartridge filter as recited in claim 6, wherein the plug-in connection includes a tongue and groove type formation of the connecting edges of two adjacent component parts.

9. The cartridge filter as recited in 1, wherein the frame strips include inwardly directed angle pieces on their longitudinal sides.

10. The cartridge filter as recited in claim 1, wherein the component parts include cut-to-length sections of a continuously extruded profile.

11. The cartridge filter as recited in claim 1, wherein the cartridge filter configured to filter fine or suspended particulate matter.

12. The cartridge filter as recited in claim 1, wherein the adjoining component parts are parallel to one another.

* * * * *